(12) United States Patent
Peng et al.

(10) Patent No.: US 11,067,883 B1
(45) Date of Patent: Jul. 20, 2021

(54) PROJECTION DEVICE

(71) Applicant: TRIPLE WIN TECHNOLOGY(SHENZHEN) CO.LTD., Shenzhen (CN)

(72) Inventors: Yu-Chieh Peng, New Taipei (TW); Ching-Huang Lin, Taoyuan (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 16/862,235

(22) Filed: Apr. 29, 2020

(30) Foreign Application Priority Data

Mar. 10, 2020 (CN) .......................... 202020282411.5

(51) Int. Cl.
*G03B 21/20* (2006.01)
(52) U.S. Cl.
CPC ................ *G03B 21/2066* (2013.01)

(58) Field of Classification Search
None
See application file for complete search history.

(56) References Cited

U.S. PATENT DOCUMENTS

2012/0154663 A1* 6/2012 Park .................... H04N 5/2251
348/333.06

* cited by examiner

*Primary Examiner* — Michelle M Iacoletti
*Assistant Examiner* — Danell L Owens
(74) *Attorney, Agent, or Firm* — ScienBiziP, P.C.

(57) ABSTRACT

A projection device includes a first lens component, a second lens component, a first reflecting sheet embedded in the first lens component, a second reflecting sheet embedded in the second lens component, a light source opposite to the first reflecting sheet, a diffractive optical element opposite to the second reflecting sheet, and a rotating subassembly. The first lens component and the second lens component are not integral. The second reflecting sheet is opposite to the first reflecting sheet. The rotating subassembly can drive the second lens component to rotate relative to the first lens component. The projection device can realize multi-directional projection of images.

15 Claims, 5 Drawing Sheets

PROJECTION DEVICE

FIELD

The present disclosure relates to a projection device.

BACKGROUND

A conventional projection device generally includes a lens, two reflective sheets disposed opposite and inclined in the lens, a light source located on one side of the lens, and a diffractive optical element located on the other side of the lens. The light emitted by the light source is reflected by two reflective sheets, enters into the diffractive optical element, and is emitted from the diffractive optical element to form a projected image. However, since the two reflection sheets are fixed in the lens, the conventional projection device can only realize projection in one direction and cannot realize multi-directional projection.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION OF EMBODIMENTS

Figure 1:
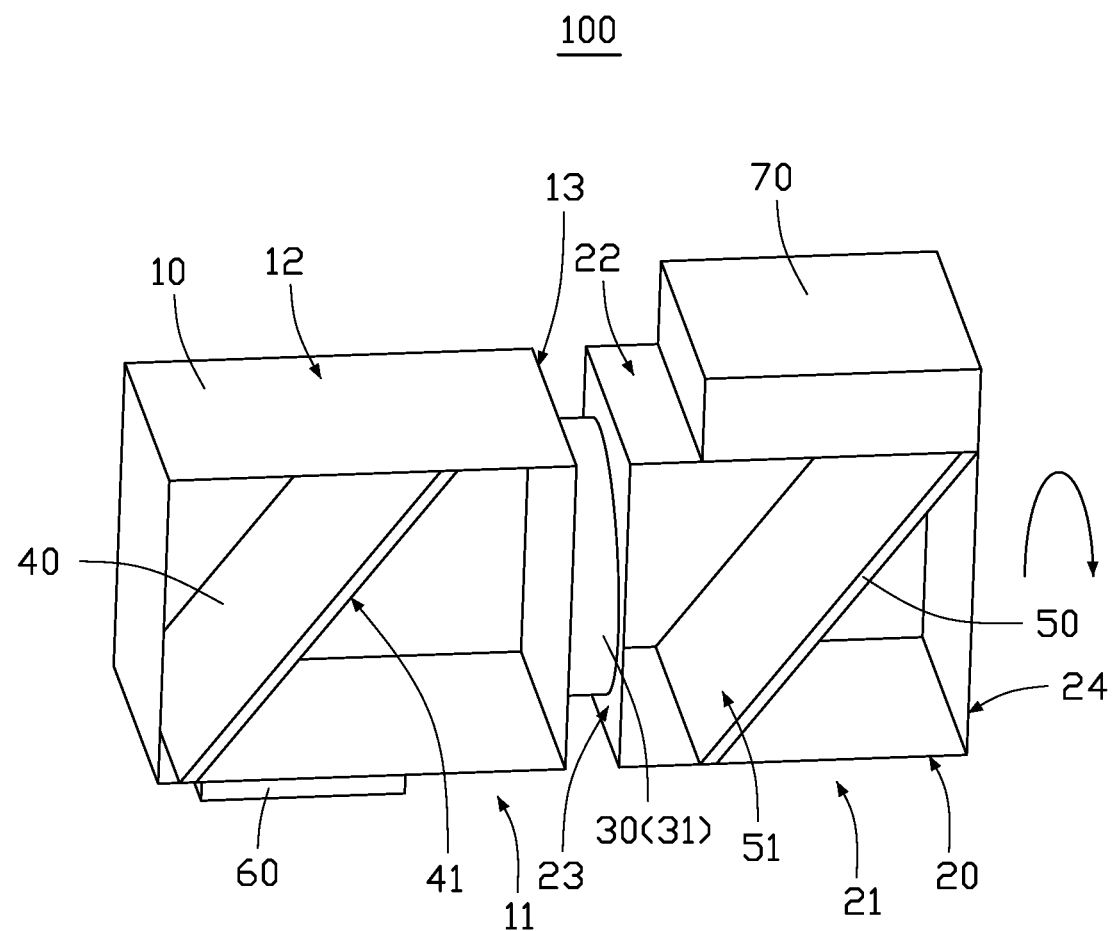
FIG. 1 is a perspective view of a first embodiment of a projection device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure Several definitions that apply throughout this disclosure will now be presented.

The term "comprising," when utilized, means "including, but not necessarily limited to"; it specifically indicates open-ended inclusion or membership in the so-described combination, group, series, and the like.

Figure 2:
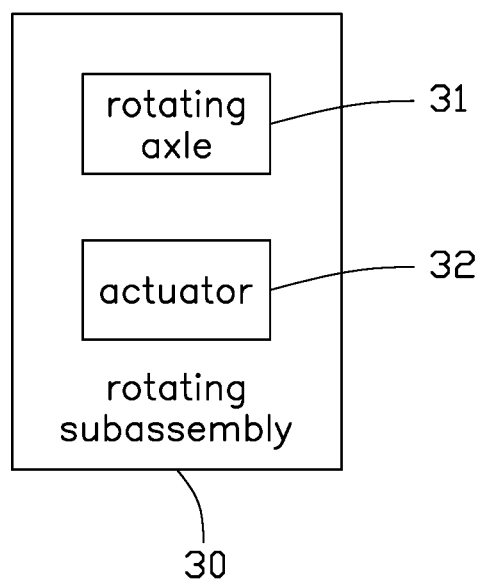
FIG. 2 is a module view of a rotating subassembly of the projection device of FIG. 1.

FIGS. 1 and 2 show a first embodiment of a projection device 100. In at least one embodiment, the projection device 100 is a face ID projection device.

The projection device 100 includes a first lens component 10, a second lens component 20, a rotating subassembly 30, a first reflecting sheet 40, a second reflecting sheet 50, a light source 60, and a diffractive optical element 70.

The first lens component 10 and the second lens component 20 are not integral. The first lens component 10 and the second lens component 20 may be two parts cut from the same lens or two independent lenses. In at least one embodiment, the first lens component 10 and the second lens component 20 are two independent lenses.

Referring to FIG. 1, the first lens component 10 includes a first surface 11, a second surface 12 opposite to the first surface 11, and a first side surface 13 connected to the first surface 11 and the second surface 12. In at least one embodiment, the first side surface 13 is perpendicularly connected to the first surface 11 and the second surface 12.

In other embodiment, the first lens component 10 further includes other surfaces except for the first surface 11, the second surface 12, and the first side surface 13.

Referring to FIG. 1, the second lens component 20 includes a third surface 21, a fourth surface 22 opposite to the third surface 21, and a second side surface 23 connected to the third surface 21 and the fourth surface 22. In at least one embodiment, the second side surface 23 is perpendicularly connected to the third surface 21 and the fourth surface 22.

The rotating subassembly 30 drives the second lens component 20 to rotate relative to the first lens component 10.

The rotating subassembly 30 includes a rotating axle 31 and an actuator 32. The actuator 32 drives the rotating axle 31 to rotate, and the rotating axle 31 drives the second lens component 20 to rotate relative to the first lens component 10 to adjust the projection angle. Defining a rotating angle of the rotating axle 31 as $\theta$, $\theta$ satisfies the following relationship: $0°\leq\theta\leq360°$. Preferably, the $\theta$ may be equal to any one of 0°, 90°, 180°, and 270°.

The actuator 32 is a motor or a magnetic driving member. In at least one embodiment, the actuator 32 is a motor.

An intersection angle between the axis of the rotating axle 31 and the first reflecting sheet 40 and/or the second reflecting sheet 50 is greater than or less than 90°.

The axis of the rotating axle 31 can be concentric or eccentric in relation to the optical path of the light from the first reflecting sheet 40 to the second reflecting sheet 50. In at least one embodiment, the axis of the rotating axle 31 is concentric with the optical path of the light from the first reflecting sheet 40 to the second reflecting sheet 50.

The rotating axle 31 is located between the second lens component 20 and the first lens component 10. One end of the rotating axle 31 is connected to the first lens component 10 rotatably, and the other end of the rotating axle 31 is fixed and connected to the second lens component 20. In at least one embodiment, one end of the rotating axle 31 is connected to the first side surface 13 rotatably, and the other end of the rotating axle 31 is fixed and connected to the second side surface 23.

The first reflecting sheet 40 is embedded in the first lens component 10. The first reflecting sheet 40 is inclined to the first surface 11. The first reflecting sheet 40 includes a first reflecting surface 41. The first reflecting surface 41 is opposite and inclined to the first surface 11.

In at least one embodiment, the first reflecting sheet 40 is a totally-reflecting sheet. The first reflecting surface 41 is a totally-reflecting surface.

The second reflecting sheet 50 is embedded in the second lens component 20. The second reflecting sheet 50 is inclined to the third surface 21. The second reflecting sheet 50 includes a second reflecting surface 51. The second reflecting surface 51 is opposite and inclined to the third surface 21.

In at least one embodiment, the second reflecting sheet 50 is a totally-reflecting sheet. The second reflecting surface 51 is a totally-reflecting surface.

The light source 60 is located on one side of the first lens component 10 and faces the first reflecting surface 41. In at least one embodiment, the light source 60 is formed on the first surface 11.

In at least one embodiment, the light source 60 is a vertical-cavity surface-emitting laser.

The diffractive optical element 70 is located on one side of the second lens component 20 and faces the second reflecting surface 51. In at least one embodiment, the diffractive optical element 70 is formed on the fourth surface 24.

The diffractive optical element 70 shapes the light beam, such as by way of homogenization, collimation, focusing, and forming a specific pattern.

Figure 3:
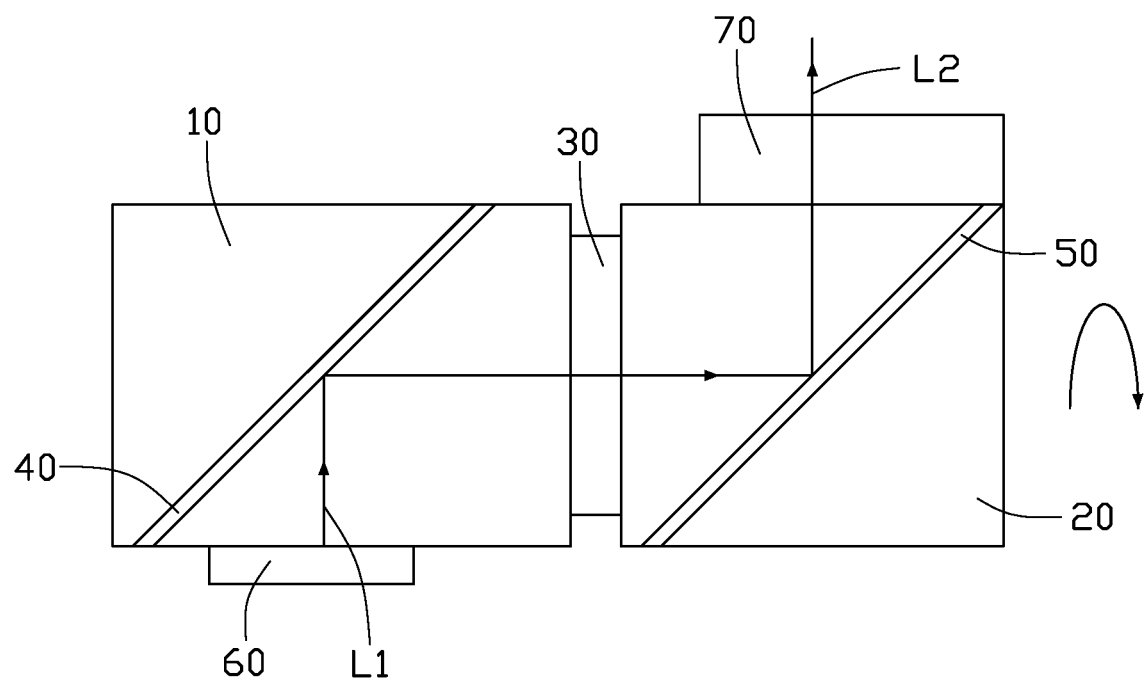
FIG. 3 is a view of an optical path of the rotating subassembly of FIG. 1, when the rotating subassembly is unrotated.

Referring to FIG. 3, FIG. 3 is a view of an optical path of the rotating subassembly of FIG. 1, when the rotating subassembly 30 is not rotated. At this time, the first reflecting sheet 40 is parallel to the second reflecting sheet 50. The first surface 11 and the fourth surface 22 are on two opposite sides of the projection device 100. The incident light L1 emitted by the light source 60 is totally reflected from the first reflecting surface 41 of the first reflecting sheet 40, and then is totally reflected onto the second reflecting surface 51 of the second reflecting sheet 50 as an outgoing light ray L2. The outgoing light ray L2 passes through the diffractive optical element 70 and exits from the diffractive optical element 70 to form a projected image. The incident light L1 and the outgoing light L2 are in a same direction.

Figure 4:
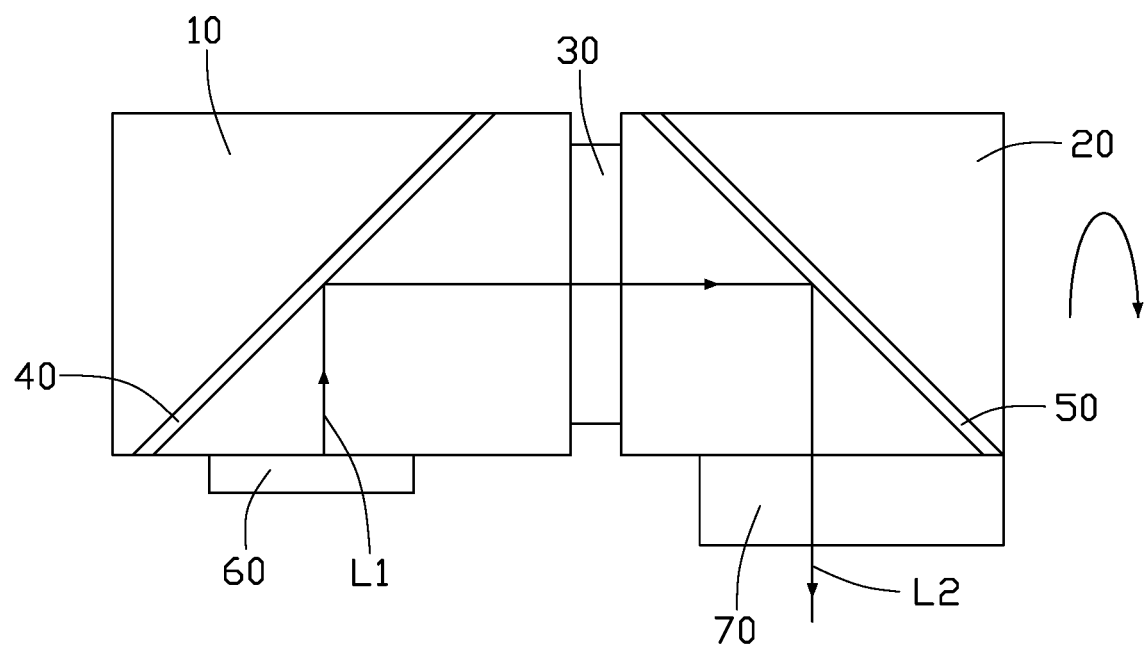
FIG. 4 is a view of an optical path of the rotating subassembly of FIG. 1, when the rotating subassembly is rotated by 180°.

Referring to FIG. 4, FIG. 4 is a view of an optical path of the rotating subassembly of FIG. 1, when the rotating subassembly 30 is rotated 10°. At this time, the first reflecting sheet 40 is inclined to the second reflecting sheet 50. The first surface 11 and the fourth surface 22 are on the same side of the projection device 100. The incident light L1 emitted by the light source 60 is totally reflected by the first reflecting surface 41 of the first reflecting sheet 40, and then is totally reflected onto the second reflecting surface 51 of the second reflecting sheet 50 as an outgoing light ray L2. The outgoing light ray L2 passes through the diffractive optical element 70 and exits from the diffractive optical element 70. The incident light L1 and the outgoing light L2 are in two opposite directions.

Figure 5:
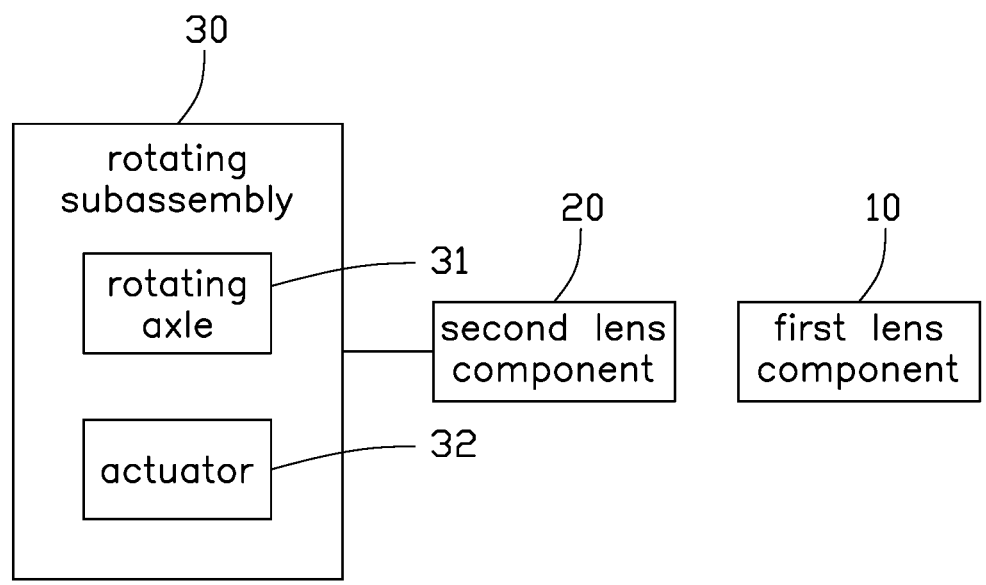
FIG. 5 is a module view of a second embodiment of a projection device according to the present disclosure.

Referring to FIG. 5, a projection device 200 is provided. The structures of the projection device 200 and the projection device 100 are basically the same, the only difference is that: the second lens component 20 and the first lens component 10 are independent of each other. The rotating subassembly 30 is located on one side of the second lens component 20, and one end of the rotating axle 31 is fixed to the second lens component 20. The actuator 32 drives the rotation axle 31 to rotate, and the rotation axle 31 drives the second lens component 20 to rotate relative to the first lens component 10 to adjust the projection angle.

In other embodiments, the rotating axle 31 may be unconnected to the second lens component 20 when the projection angle does not need to be adjusted, but the rotating axle 31 is fixed on the second lens component 20 when the projection angle needs to be adjusted.

With the above configuration, the projection device 100 sets a lens into first lens component 10 and an independent second lens component 20, and uses a subassembly 30 to rotate the second lens component 20 relative to the first lens component 10, to adjust a relative positional relationship between the second reflecting sheet 50 embedded in the second lens component 20 and the first reflecting sheet 40 embedded in the first lens component, to adjust the direction of the outgoing light L2 to realize multi-directional projection of images.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A projection device, wherein the projection device comprises:
    a first lens component;
    a second lens component, the first lens component and the second lens component are not integral;
    a first reflecting sheet embedded in the first lens component;
    a second reflecting sheet embedded in the second lens component, the second reflecting sheet is opposite to the first reflecting sheet;
    a light source opposite to the first reflecting sheet;
    a diffractive optical element opposite to the second reflecting sheet; and
    a rotating subassembly, the rotating subassembly is used to drive the second lens component to rotate relative to the first lens component.

2. The projection device of claim 1, wherein the rotating subassembly comprises a rotating axle and an actuator, the actuator drives the rotating axle to rotate, and the rotating axle drives the second lens component to rotate relative to the first lens component to adjust a projection angle.

3. The projection device of claim 2, wherein one end of the rotating axle is connected to the first lens component rotatably, and the other end of the rotating axle is fixed to the second lens component.

4. The projection device of claim 3, wherein the first lens component comprises a first surface, a second surface opposite to the first surface, and a first side surface connected to the first surface and the second surface; one end of the rotating axle is connected to the first side surface rotatably, and the other end of the rotating axle is fixed to the second side surface.

5. The projection device of claim 2, wherein the second lens component and the first lens component are independent of each other, the rotating subassembly is located on one side of the second lens component, and one end of the rotating axle is fixed to the second lens component.

6. The projection device of claim 2, wherein the second lens component and the first lens component are independent of each other.

7. The projection device of claim 2, wherein the actuator is a motor.

8. The projection device of claim 2, wherein an intersection angle between an axis of the rotating axle and the first reflecting sheet and/or the second reflecting sheet is greater than or less than 90°.

9. The projection device of claim 7, wherein the actuator is a magnetic driving member.

10. The projection device of claim 2, wherein a rotating angle of the rotating axle is defined as θ, and the θ satisfies the following relationship: 0°≤θ≤360°.

11. The projection device of claim 10, wherein the θ is equal to any one of 0°, 90°, 180°, and 270°.

12. The projection device of claim 1, wherein the first reflecting sheet comprises a first reflecting surface, the light source is located on one side of the first lens component and faces the first reflecting surface.

13. The projection device of claim 12, wherein the light source is formed on the first lens component.

14. The projection device of claim 1, wherein the second reflecting sheet comprises a second reflecting surface, the diffractive optical element is located on one side of the second lens component and faces the second reflecting surface.

15. The projection device of claim 14, wherein the diffractive optical element is formed on the second lens component.

* * * * *